United States Patent
Masuko

(10) Patent No.: US 11,003,659 B2
(45) Date of Patent: May 11, 2021

(54) SEARCH SYSTEM, SEARCH CRITERIA SETTING DEVICE, CONTROL METHOD FOR SEARCH CRITERIA SETTING DEVICE, PROGRAM, AND INFORMATION STORAGE MEDIUM

(71) Applicant: Rakuten, Inc., Tokyo (JP)

(72) Inventor: Soh Masuko, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 747 days.

(21) Appl. No.: 15/031,270

(22) PCT Filed: Oct. 25, 2013

(86) PCT No.: PCT/JP2013/079047
§ 371 (c)(1),
(2) Date: Apr. 22, 2016

(87) PCT Pub. No.: WO2015/059838
PCT Pub. Date: Apr. 30, 2015

(65) Prior Publication Data
US 2016/0267131 A1 Sep. 15, 2016

(51) Int. Cl.
*G06F 16/2453* (2019.01)
*G06F 16/33* (2019.01)
*G06F 16/9032* (2019.01)

(52) U.S. Cl.
CPC ........ *G06F 16/24534* (2019.01); *G06F 16/33* (2019.01); *G06F 16/9032* (2019.01)

(58) Field of Classification Search
CPC ......... G06F 17/30448; G06F 17/30967; G06F 17/30634
See application file for complete search history.

(56) References Cited

U.S. PATENT DOCUMENTS

| 7,289,982 B2* | 10/2007 | Saito | ......... G06F 17/30616 |
| 8,099,418 B2* | 1/2012 | Inoue | ......... G06F 17/30979 |
| | | | 707/748 |
| 2003/0217052 A1* | 11/2003 | Rubenczyk | ....... G06F 17/30643 |

(Continued)

FOREIGN PATENT DOCUMENTS

WO  2011093358 A1  8/2011

OTHER PUBLICATIONS

OrDooBig et al: "RecommenderSystem", Wikipedia—the free encyclopedia, Oct. 22, 2013 (Oct. 22, 2013), pp. 1-10, KP055363941, Retrieved from the Internet:URL:https://en.wikipedia.org/w/index.php? (Year: 2013).*

(Continued)

*Primary Examiner* — Aleksandr Kerzhner
*Assistant Examiner* — Aryan D Toughiry
(74) *Attorney, Agent, or Firm* — HEA Law PLLC

(57) ABSTRACT

A duplicate word acquisition unit acquires, as a duplicate word, when an item is selected by a user from a list of items to be selected by the user, a word contained in both text information associated with the item selected by the user and text information associated with another item having a predetermined relationship with the item selected by the user. A search condition setting unit sets a search condition for searching for an item similar to the item selected by the user based on the duplicate word. A search execution unit executes a search based on the search condition.

15 Claims, 9 Drawing Sheets

(56) References Cited

U.S. PATENT DOCUMENTS

| | | | | |
|---|---|---|---|---|
| 2006/0015486 A1* | 1/2006 | Nomiyama | | G06F 16/33 |
| 2008/0263036 A1* | 10/2008 | Yamamoto | | G06F 17/30011 |
| 2009/0248674 A1* | 10/2009 | Suzuki | | G06F 17/30867 |
| 2010/0332583 A1* | 12/2010 | Szabo | | G06F 16/248 |
| | | | | 709/202 |
| 2011/0239163 A1* | 9/2011 | Mochizuki | | G06F 3/0482 |
| | | | | 715/853 |
| 2012/0284283 A1* | 11/2012 | Matsushita | | G06F 16/9535 |
| | | | | 707/748 |
| 2013/0013591 A1* | 1/2013 | Hu | | G06F 16/58 |
| | | | | 707/723 |
| 2013/0073335 A1* | 3/2013 | Tang | | G06Q 30/02 |
| | | | | 705/7.29 |
| 2013/0117303 A1* | 5/2013 | Morimatsu | | G06F 16/33 |
| | | | | 707/769 |
| 2013/0191783 A1* | 7/2013 | Sugita | | G06F 3/04842 |
| | | | | 715/810 |
| 2013/0254209 A1* | 9/2013 | Kang | | G06F 17/30672 |
| | | | | 707/741 |
| 2013/0282710 A1* | 10/2013 | Raghavan | | G06F 16/248 |
| | | | | 707/728 |
| 2013/0311502 A1* | 11/2013 | Takata | | G06F 17/30253 |
| | | | | 707/758 |
| 2014/0136517 A1* | 5/2014 | Li | | G06F 16/345 |
| | | | | 707/722 |
| 2014/0372951 A1* | 12/2014 | Li | | G06F 16/583 |
| | | | | 715/835 |

OTHER PUBLICATIONS

DrDooBig et al: "RecommenderSystem",Wikipedia—the free encyclopedia, Oct. 22, 2013 (Oct. 22, 2013),pp. 1-10, XP055363941,Retrieved from the Internet:URL:https://en.wikipedia.org/w/index.php?title=Recommender_system&oldid=578310781[retrieved on Apr. 11, 2017].

Search Report dated Apr. 25, 2017, for corresponding EP Patent ApplicationNo.13896181.8.

"Yahoo! product search help", [online], [retrieved on Oct. 18, 2013], Internet http://www.yahoo-help.jp/app/answers/detail/p/586/a_id/42561/ Pertinent parts discussed in "Background Art" of the specification.

* cited by examiner

FIG.5

| STORE ID | PRODUCT ID | TITLE | PRICE | PRODUCT IMAGE | PRODUCT PAGE |
|---|---|---|---|---|---|
| S1 | P1 | ABC 2013/14 AUTUMN AND WINTER NEW RELEASE X SERIES TOTE BAG VIOLET 8HS999 043 001 [FREE SHIPPING] [50% OFF] [NEW AND UNUSED] | --- | --- | --- |
| S2 | P1 | ABC 8H999-043 001 VIOLET X SERIES HANDBAG | --- | --- | --- |
| ⋮ | ⋮ | ⋮ | ⋮ | ⋮ | ⋮ |

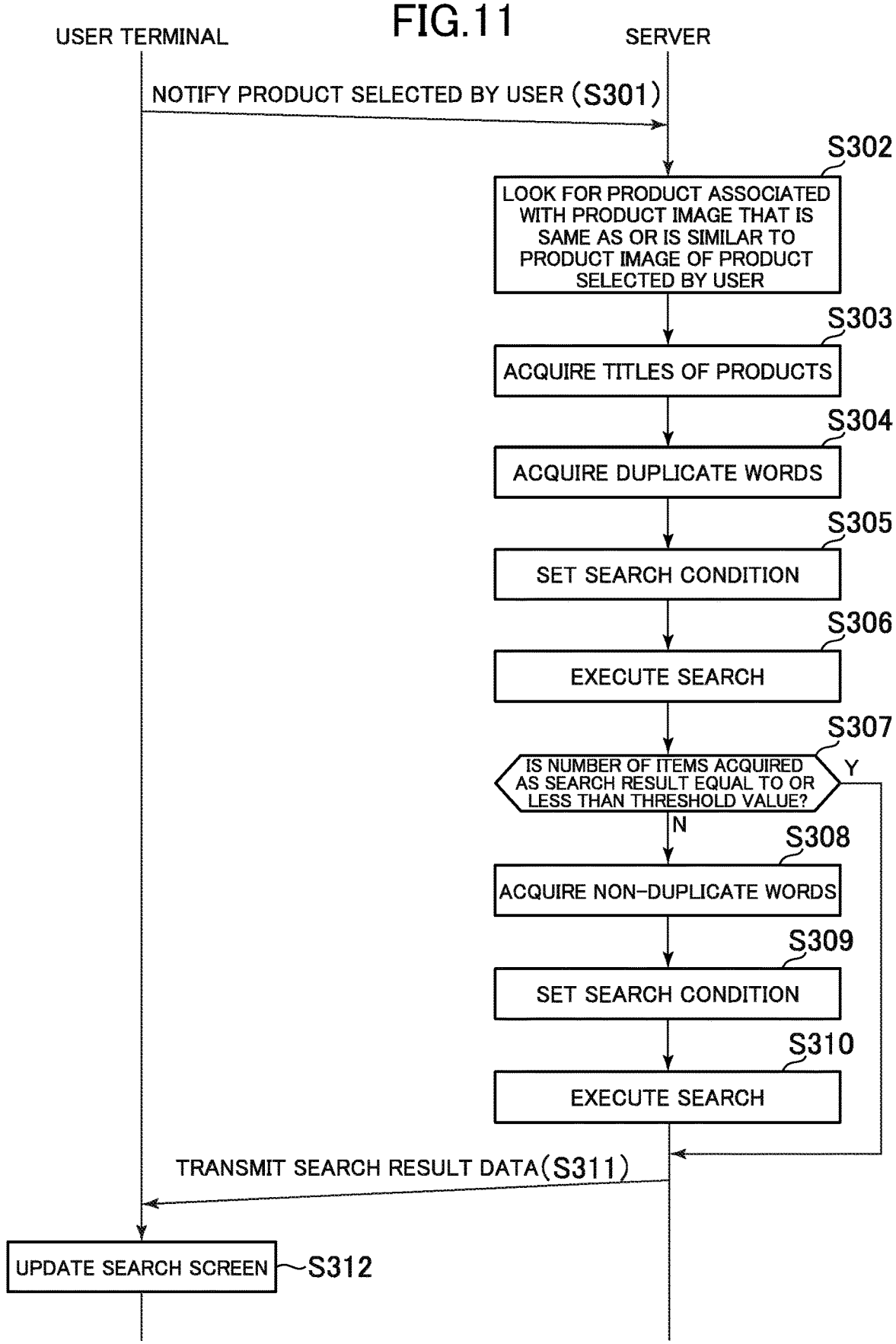

SEARCH SYSTEM, SEARCH CRITERIA SETTING DEVICE, CONTROL METHOD FOR SEARCH CRITERIA SETTING DEVICE, PROGRAM, AND INFORMATION STORAGE MEDIUM

CROSS REFERENCE TO RELATED APPLICATIONS

This application is a National Stage of International Application No. PCT/JP2013/079047 filed on Oct. 25, 2013. The contents of the above document is incorporated herein by reference in its entirety.

TECHNICAL FIELD

The present invention relates to a search system, a search condition setting device, a control method for a search condition setting device, a program, and an information storage medium.

BACKGROUND ART

There is known a search system configured to set, when a user selects any one of items displayed on an item list screen, a search condition for searching for an item similar to the item selected by the user based on a word contained in text information associated with the item selected by the user.

For example, a product search system described in Non Patent Literature 1 has a function of setting, when a user selects any one of products displayed on a product list screen, a search condition for searching for a product similar to the product selected by the user. In this product search system, a "similar product search" link button is associated with each product. When the user clicks on a "similar product search" link button associated with any one of products, a plurality of keywords are automatically extracted from a title (name) of the product, and a product including all of the plurality of keywords is searched for.

CITATION LIST

Non Patent Literature

[Non Patent Literature 1] "Yahoo! product search help", [online], [retrieved on Oct. 18, 2013], Internet <http://www.yahoo-help.jp/app/answers/detail/p/586/a_id/42567/>

SUMMARY OF INVENTION

Technical Problem

In general, in a virtual shopping mall, in which a plurality of stores are opened, each store registers a title of a product. Each store tends to include various keywords in a title of a product in order for the product to match various search keywords. Thus, in the product search system as described above, there is a fear that a keyword unnecessary for searching for a similar product is extracted from the title of the product and such a keyword is included in a search condition. As a result, there is a fear that an accuracy of the search condition for searching for a similar product deteriorates and such a search result as to satisfy the user cannot be acquired as a search result for a similar product.

The present invention has been made in view of the above-mentioned problem, and it is an object of the present invention to provide a search system, a search condition setting device, a control method for a search condition setting device, a program, and an information storage medium capable of improving an accuracy of a search condition in a case where the search condition for searching for an item similar to an item selected by a user is set based on a word contained in text information associated with the item selected by the user.

Solution to Problem

In order to solve the above-mentioned problem, a search system according to one embodiment of the present invention includes: duplicate word acquisition means for acquiring, as a duplicate word, when an item is selected by a user from a list of items to be selected by the user, a word contained in both text information associated with the item selected by the user and text information associated with another item having a predetermined relationship with the item selected by the user; search condition setting means for setting a search condition for searching for an item similar to the item selected by the user based on the duplicate word; and search execution means for executing a search based on the search condition.

Further, a control method for a search system according to one embodiment of the present invention includes: a duplicate word acquisition step of acquiring, as a duplicate word, when an item is selected by a user from a list of items to be selected by the user, a word contained in both text information associated with the item selected by the user and text information associated with another item having a predetermined relationship with the item selected by the user; a search condition setting step of setting a search condition for searching for an item similar to the item selected by the user based on the duplicate word; and a search execution step of executing a search based on the search condition.

Further, a search condition setting device according to one embodiment of the present invention includes: duplicate word acquisition means for acquiring, as a duplicate word, when an item is selected by a user from a list of items to be selected by the user, a word contained in both text information associated with the item selected by the user and text information associated with another item having a predetermined relationship with the item selected by the user; and search condition setting means for setting a search condition for searching for an item similar to the item selected by the user based on the duplicate word.

Further, a control method for a search condition setting device according to one embodiment of the present invention includes: a duplicate word acquisition step of acquiring, as a duplicate word, when an item is selected by a user from a list of items to be selected by the user, a word contained in both text information associated with the item selected by the user and text information associated with another item having a predetermined relationship with the item selected by the user; and a search condition setting step of setting a search condition for searching for an item similar to the item selected by the user based on the duplicate word.

Further, a program according to one embodiment of the present invention is a program for causing a computer to function as: duplicate word acquisition means for acquiring, as a duplicate word, when an item is selected by a user from a list of items to be selected by the user, a word contained in both text information associated with the item selected by the user and text information associated with another item having a predetermined relationship with the item selected by the user; and search condition setting means for setting a search condition for searching for an item similar to the item selected by the user based on the duplicate word.

Further, an information storage medium according to one embodiment of the present invention is a computer-readable information storage medium storing a program for causing a computer to function as: duplicate word acquisition means for acquiring, as a duplicate word, when an item is selected by a user from a list of items to be selected by the user, a word contained in both text information associated with the item selected by the user and text information associated with another item having a predetermined relationship with the item selected by the user; and search condition setting means for setting a search condition for searching for an item similar to the item selected by the user based on the duplicate word.

Further, in one aspect of the present invention, the duplicate word acquisition means may also acquire, as the duplicate word, a word whose meaning is the same as or is similar to that of a word contained in text information associated with the other item among words contained in text information associated with the item selected by the user.

Further, in one aspect of the present invention, the search condition setting means may include first search condition setting means for setting, when one duplicate word is acquired by the duplicate word acquisition means, the search condition to contain the one duplicate word, and for setting, when a plurality of duplicate words are acquired by the duplicate word acquisition means, the search condition to contain at least two duplicate words concatenated with an AND condition.

Further, in one aspect of the present invention, the search system may further include non-duplicate word acquisition means for acquiring, as a non-duplicate word, a word contained in only one of text information associated with the item selected by the user and text information associated with the other item and the search condition setting means may further include second search condition setting means for setting, when at least one duplicate word is acquired by the duplicate word acquisition means and a plurality of non-duplicate words are acquired by the non-duplicate word acquisition means, the search condition by concatenating, with an AND condition, the at least one duplicate word and the plurality of non-duplicate words concatenated with an OR condition.

Further, in one aspect of the present invention, the search execution means may include: first search execution means for executing a search based on a search condition set by the first search condition setting means; and second search execution means for executing a search based on a search condition set by the second search condition setting means. The search system may further include list presentation means for presenting, to the user, a list of items acquired through a search by the first search execution means or the second search execution means. The list presentation means may include: means for presenting, to the user, when a number of items contained in the list acquired through the search by the first search execution means is less than a threshold value, the list acquired through the search by the first search execution means; and means for presenting, to the user, when the number of items contained in the list acquired through the search by the first search execution means is more than the threshold value, the list acquired through the search by the second search execution means.

Further, in one aspect of the present invention, the other item may be an item associated with an image that is the same as or is similar to an image associated with the item selected by the user.

Further, in one aspect of the present invention, the other item may be an item associated with identification information that is the same as or is similar to identification information associated with the item selected by the user.

Further, in one aspect of the present invention, when a plurality of items are selected by the user from the list, the item selected by the user may be one item out of the plurality of items selected by the user, and the other item may be another item out of the plurality of items selected by the user.

Further, in one aspect of the present invention, the search system may further include means for acquiring a category word, the category word being a word indicating a category of the item selected by the user. In the search system, the search condition setting means may set a search condition for searching for an item similar to the item selected by the user based on the duplicate word and the category word.

Advantageous Effects of Invention

According to the embodiments of the present invention, it is possible to improve the accuracy of the search condition in the case where the search condition for searching for an item similar to the item selected by the user is set based on a word contained in text information associated with the item selected by the user.

BRIEF DESCRIPTION OF DRAWINGS

FIG. 5 is a table for showing an example of a product information table.

FIG. 11 is a diagram for illustrating an example of processing to be executed by the electronic commerce system according to the fifth embodiment.

DESCRIPTION OF EMBODIMENTS

Now, an exemplary embodiment of the present invention is described in detail with reference to the drawings. In the following, an example of a case is described in which the present invention is applied to an electronic commerce system that implements a virtual shopping mall in which a plurality of stores are opened. Specifically, the description is about an example of a case where a search system according to the embodiment of the present invention is implemented in an electronic commerce system.

First Embodiment

Figure 1:
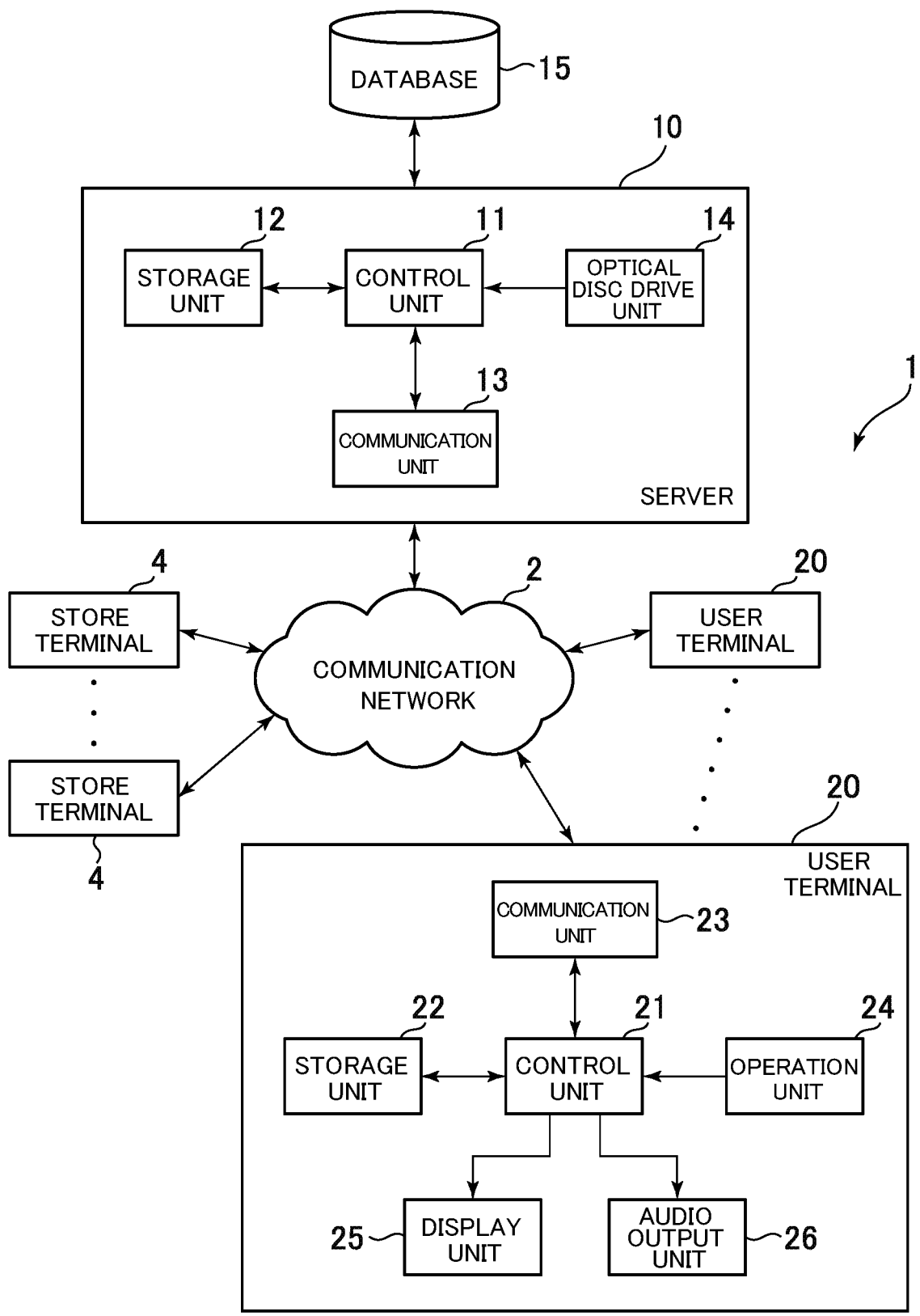
FIG. 1 is a diagram for illustrating an example of an overall configuration of an electronic commerce system (search system) according to an embodiment of the present invention.

FIG. 1 is an illustration of an example of an overall configuration of an electronic commerce system 1 (search system) according to the first embodiment of the present invention. As illustrated in FIG. 1, the electronic commerce system 1 according to the first embodiment includes a server 10, a database 15, a user terminal 20, and a store terminal 4. The server 10, the user terminal 20, and the store terminal 4 are connected to a communication network 2, which is configured to include, for example, the Internet or the like. Mutual data communication is available between the server 10 and the user terminal 20, and mutual data communication is also available between the server 10 and the store terminal 4.

The server 10 is a server which functions as a portal of the virtual shopping mall. As illustrated in FIG. 1, the server 10 includes a control unit 11, a storage unit 12, a communication unit 13, and an optical disc drive unit 14. The control unit 11 includes one or a plurality of microprocessors and executes information processing in accordance with a program stored in the storage unit 12. The storage unit 12 includes a main memory unit (e.g., RAM) and an auxiliary storage unit (e.g., ROM, hard disk drive, or solid state drive). The communication unit 13 is configured to execute data communication via the communication network 2.

The optical disc drive unit 14 is configured to read a program or data recorded on an optical disc (information storage medium). The program or data is supplied to the storage unit 12 via an optical disc (information storage medium). Specifically, the program or data stored on the optical disc is read by the optical disc drive unit 14 and stored in the storage unit 12.

Note that, the server 10 may include a component (e.g., memory card slot unit) configured to read a program or data stored in an information storage medium other than the optical disc (e.g., memory card). Then, the program or data may be supplied to the storage unit 12 via the information storage medium other than the optical disc. Further, a program or data may be supplied to the storage unit 12 via the communication network 2.

The server 10 can access the database 15. The database 15 stores, for example, data on a user who uses the virtual shopping mall, data on a store opened in the virtual shopping mall, data on a product available in the virtual shopping mall, and data on a history of a transaction made in the virtual shopping mall. Note that, the database 15 may be built in a server other than the server 10, or may be built in the server 10.

The user terminal 20 is an information processing device to be used by a user. For example, the user terminal 20 is a mobile phone (including smartphone), a tablet computer, a laptop computer, or a desktop computer.

As illustrated in FIG. 1, the user terminal 20 includes a control unit 21, a storage unit 22, a communication unit 23, an operation unit 24, a display unit 25, and an audio output unit 26. The control unit 21, the storage unit 22, and the communication unit 23 are similar to the control unit 11, the storage unit 12, and the communication unit 13 of the server 10.

A program or data is supplied to the storage unit 22 via the communication network 2. Note that, the user terminal 20 may include a component (e.g., optical disc drive unit or memory card slot unit) configured to read a program or data stored in an information storage medium (e.g., optical disc or memory card). Then, the program or data may be supplied to the storage unit 22 via the information storage medium (e.g., memory card).

The operation unit 24 is used by a user for operation. For example, when a pointing device for specifying a position in a screen displayed on the display unit 25 is included in the user terminal 20, the pointing device corresponds to the operation unit 24. That is, for example, a mouse, a stick, a touch pad, or a touch panel overlaid on the display unit 25 corresponds to the operation unit 24.

The display unit 25 is, for example, a liquid crystal display or an organic EL display, and is configured to display various screens. The audio output unit 26 is, for example, a speaker or headphones, and is configured to output various sounds.

The store terminal 4 is an information processing device that is provided in the store opened in the virtual shopping mall. The store terminal 4 is used to register information on a product to be sold in the virtual shopping mall and other types of information in the database 15 via the server 10. For example, the store terminal 4 is a tablet computer, a laptop computer, or a desktop computer. The store terminal 4 has a hardware configuration similar to that of the user terminal 20.

For example, a daemon program (e.g., HTTP daemon) is executed on the server 10. Further, a program (e.g., web browser) is started on the user terminal 20, and a processing request (e.g., HTTP request) is transmitted from the user terminal 20 to the server 10. In this case, a processing result (e.g., HTTP response) corresponding to the above-mentioned processing request is transmitted to the user terminal 20 from the server 10. For example, data described in a page description language is transmitted to the user terminal 20. Then, a screen that is based on the processing result is displayed on the display unit 25 of the user terminal 20 on the basis of this data. Note that, similar processing is performed between the store terminal 4 and the server 10.

In the following, a description is given of a screen displayed on the display unit 25 of the user terminal 20 when the virtual shopping mall is used. The screen described below is displayed through execution of a data communication between the user terminal 20 and the server 10.

Figure 2:
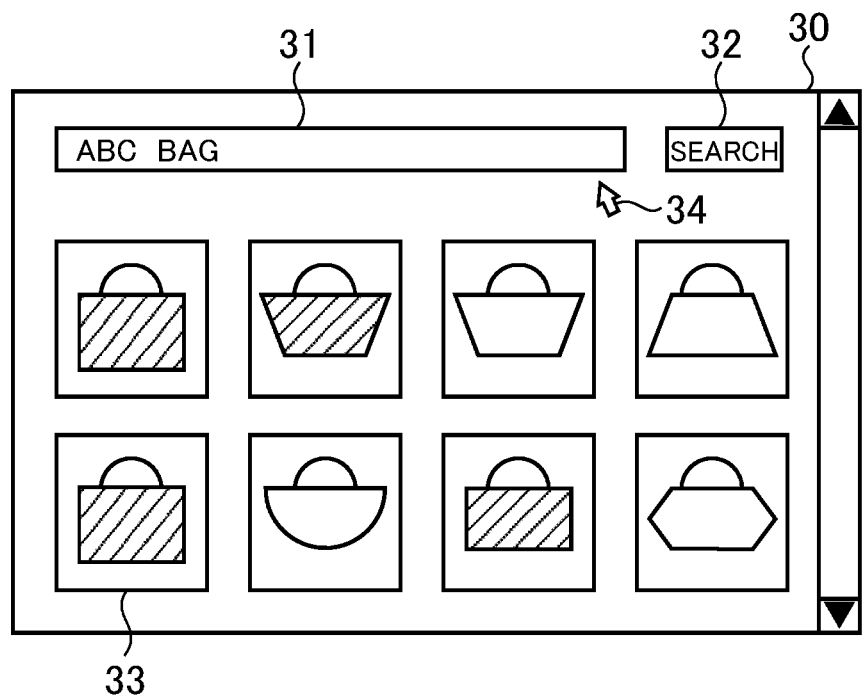
FIG. 2 is a diagram for illustrating an example of a search screen.

When the virtual shopping mall is used, the user uses the user terminal 20 to access the server 10. The user specifies a keyword and searches for a product, to thereby look for a desired product. FIG. 2 is an illustration of an example of a search screen for searching for a product.

A search screen 30 illustrated in FIG. 2 includes a keyword field 31 and a search button 32. A keyword for searching for a product is input to the keyword field 31. In the search screen 30 illustrated in FIG. 2, two keywords, namely, "ABC" and "bag" are input to the keyword field 31. Those words are keywords for searching for a bag manufactured by, for example, ABC company.

When the search button 32 is clicked, search processing is executed and a list of products whose title or product page contains all of the keywords input to the keyword field 31 is displayed on the search screen 30. A list of product images 33 is displayed on the search screen 30 illustrated in FIG. 2, and a title, a price, and the like of a product are omitted.

The product image 33 is an image registered by each store in advance. In general, the store uses an image provided by a manufacturer of a product as the product image 33. In the virtual shopping mall, the same product may be sold by more than one store, but it is often the case that the product images 33 of the same product are often the same or similar with each other. Note that, however, the product images 33 are registered by each store, and thus there is a case that the product images 33 of the same product are not the same or a similar with each other. Further, a character string such as "free shipping" or "greatly popular", or an ornament, for example, may be appended to the product image 33.

When the user clicks any one of the product images 33, a product screen (not shown) relating to a product associated with the product image 33 is displayed on the display unit 25 of the user terminal 20. The product screen is a screen for checking detailed information on a product or for purchasing a product.

The electronic commerce system 1 has a function of supporting a search for a similar product of a desired product. In the following, a description is given of this function.

Figure 3:
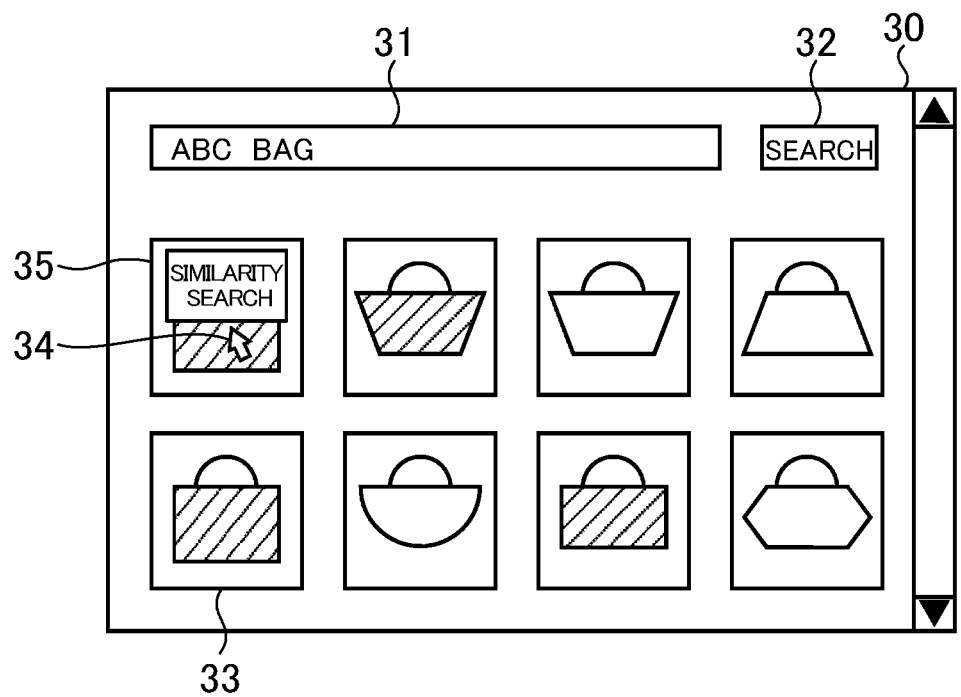
FIG. 3 is a diagram for illustrating another example of the search screen.

When a similar product is searched for, the user moves a cursor 34 onto the product image 33 to select a desired product. When the user moves the cursor 34 onto the product image 33, a similarity search icon 35 is displayed on the product image 33 as illustrated in FIG. 3. The similarity search icon 35 is used to give an instruction to search for a similar product of the product associated with the product image 33.

When the user clicks the similarity search icon 35, at least one of words contained in a title of the product selected by the user is acquired. Further, a search condition for searching for a similar product is set based on the acquired word. Then, a search is executed based on the search condition and a list of products acquired by the search is displayed on the search screen 30.

Figure 4:
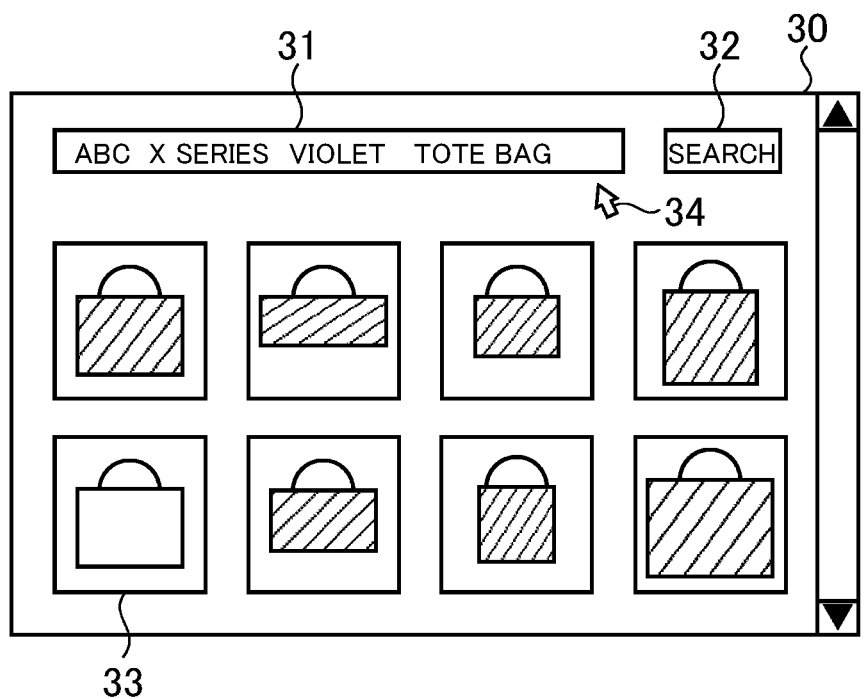
FIG. 4 is a diagram for illustrating still another example of the search screen.

FIG. 4 is an illustration of an example of the search screen 30 in this case. In the search screen 30 illustrated in FIG. 4, four keywords, namely, "ABC", "X series", "violet", and "tote bag" are input to the keyword field 31. Those keywords are acquired from the title of the product selected by the user. Note that, in this case, a list of the product images 33 of products whose title or product page contains all of the above-mentioned four keywords is displayed on the search screen 30.

In the electronic commerce system 1, it is configured to lower a possibility that a word unnecessary for searching for a similar product is set as the keyword. In the following, a description is given of a configuration for realizing this.

First, a description is given of data stored in the database 15. As described above, the data on a user who uses the virtual shopping mall, the data on a store opened in the virtual shopping mall, and the data on a product available in the virtual shopping mall are stored in the database 15.

FIG. 5 is an illustration of an example of a product information table. The product information table shows information on products sold at each store. The product information table shown in FIG. 5 contains "store ID", "product ID", "title", "price", "product image", and "product page" fields.

The "store ID" field shows a store ID of a store. The store ID is identification information for uniquely identifying a store. The "product ID" field shows a product ID of a product sold in a store. The product ID is identification information for uniquely identifying a product. Even when different stores sell the same products, the same product ID is appended to those products.

The "title" field shows a title (name) of a product registered by a store. The electronic commerce system 1 is configured so that each store registers a title of a product. Each store tends to include various keywords in a title of a product in order for the product to match various search keywords. Thus, as shown in FIG. 5, numerous words are contained in a title of a product. Those numerous words contain a word that has low relevance to product-specific characteristics (that is, a word that is not beneficial for searching for a similar product) as well as a word that have high relevance to product-specific characteristics (that is, a word that is beneficial for searching for a similar product).

The "price" field shows a selling price of a product registered by a store. In the electronic commerce system. 1, each store is allowed to register a selling price of a product. The "product image" field shows link information to a product image registered by a store. The "product page" field shows link information to a product page registered by a store.

Figure 6:
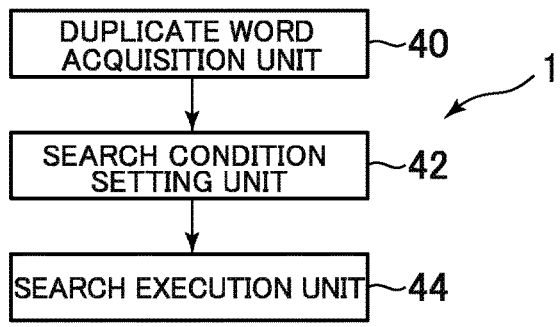
FIG. 6 is a functional block diagram for illustrating an example of functions implemented in an electronic commerce system according to first to third embodiments of the present invention.

FIG. 6 is a functional block diagram for illustrating functional blocks implemented in the electronic commerce system 1. As illustrated in FIG. 6, the electronic commerce system 1 includes a duplicate word acquisition unit 40 (duplicate word acquisition means), a search condition setting unit 42 (search condition setting means), and a search execution unit 44 (search execution means).

Those functional blocks are implemented by the server 10 or the user terminal 20. In the following, a description is given of a case where those functional blocks are implemented by the server 10 (search condition setting device). That is, a description is given of a case where the control unit 11 of the server 10 executes processing in accordance with a program to thereby function as the duplicate word acquisition unit 40, the search condition setting unit 42, and the search execution unit 44.

The duplicate word acquisition unit 40 acquires, as a duplicate word, when the user selects an item from a list of items to be selected by the user, a word that is contained in both text information associated with the item selected by the user and text information associated with another item having a predetermined relationship with the item selected by the user.

Note that, the "item" is a target that may be searched for, and refers to, for example, a product or a service. Further, "another item having a predetermined relationship with the item selected by the user" is, for example, "an item associated with an image that is the same as or is similar to an image associated with the item selected by the user".

In the case of the above-mentioned example (refer to FIG. 2 to FIG. 4), the list of products displayed on the search screen 30 corresponds to an example of the "list of items". Further, the product selected by the user (that is, the product that corresponds to the product image 33 the similarity search icon 35 of which has been clicked) corresponds to an example of the "item selected by the user". Further, a product associated with a product image that is the same as or is similar to the product image of the product selected by the user corresponds to an example of "another item". Further, the title of a product corresponds to an example of "text information".

For example, the duplicate word acquisition unit 40 looks for a product image that is the same as or is similar to the product image of the product selected by the user (hereinafter referred to as "similar product image"). For example, the duplicate word acquisition unit 40 looks for a similar product image from among the product images 33 displayed on the search screen 30. The duplicate word acquisition unit 40 may look for a similar product image from among product images that are not displayed on the search screen 30. Note that, a known method may be adopted as a method of determining whether or not product images are the same with or are similar to each other. Further, when a similarity degree between product images is more than a threshold value, those product images may be determined to be similar to each other.

After that, the duplicate word acquisition unit 40 acquires the title of the product selected by the user and the title of a product corresponding to the similar product image. Then, the duplicate word acquisition unit 40 acquires words that are contained in the respective titles through natural language processing.

Now, it is assumed that the title of the product selected by the user is "(a)" given below, and the title of the product corresponding to the similar product image is "(b)" given below.

(a) ABC 2013/14 autumn and winter new release X series tote bag violet 8HS999 043 001 [free shipping] [50% OFF] [new and unused]

(b) ABC 8H999-043 001 violet X series handbag

The duplicate word acquisition unit 40 excludes a word containing a number from the words that are acquired from the respective titles. For example, a word indicating discount information is not a word indicating a product-specific characteristic, and thus this word is not beneficial for searching for a similar product. The duplicate word acquisition unit 40 excludes a word containing a number, to thereby exclude a word indicating this kind of discount information.

After that, the duplicate word acquisition unit 40 acquires a word that is contained in duplicate in both of those titles as a duplicate word. In this case, for example, duplicate words as given below are acquired.

"ABC", "X series", "violet"

Note that, the duplicate word acquisition unit 40 may acquire a duplicate word based on dictionary data in which synonyms (words having the same meaning) or similar words (words having a similar meaning) are registered. That is, the duplicate word acquisition unit 40 may acquire, as the duplicate word, a word that has the meaning that is the same as or similar to that of a word contained in the title of a product corresponding to a similar product image among words contained in the title of the product selected by the user.

For example, when "bag" and "briefcase" are registered in dictionary data as synonyms (or similar words), the word "bag" is contained in the title of the product selected by the user, and the word "briefcase" is contained in the title of a product corresponding to the similar product image, the duplicate word acquisition unit 40 may recognize those words as duplicate words.

Note that, the above-mentioned dictionary data may be dictionary data indicating synonyms or similar words between different languages. For example, the duplicate word acquisition unit 40 may translate a word written in one language (e.g., written in Japanese) contained in the title of the product selected by the user into a word written in another language (e.g., written in English) based on the dictionary data, and determine whether or not the word written in the other language is contained in the title of a product corresponding to the similar product image. Then, when the word written in the other language is contained, the duplicate word acquisition unit 40 may recognize those words as duplicate words.

Further, the duplicate word acquisition unit 40 determines whether or not a word indicating a category (hereinafter referred to as "category word") is contained in the title of the product selected by the user. For example, the duplicate word acquisition unit 40 executes the above-mentioned determination based on dictionary data in which category words are registered. Further, for example, when the category is registered in association with the product ID, this information may be utilized.

In this case, for example, a category word as given below is acquired.

"tote bag"

As described above, the duplicate word acquisition unit 40 acquires duplicate words and category words as given below.

"ABC", "X series", "violet", "tote bag"

Although a case where only one similar product image is considered has been given here, a plurality of similar product images may be considered as well.

The search condition setting unit 42 sets a search condition for searching for an item similar to the item selected by the user based on the duplicate word that is acquired by the duplicate word acquisition unit 40.

For example, when the duplicate word acquisition unit 40 acquires one duplicate word, the search condition setting unit 42 (first search condition setting means) sets a search condition to contain this one duplicate word.

On the other hand, when the duplicate word acquisition unit 40 acquires a plurality of duplicate words, the search condition setting unit 42 (first search condition setting means) sets a search condition to contain at least two duplicate words concatenated with an AND condition.

A search condition is set as below, for example.

"ABC" and "X series" and "violet" and "tote bag"

Note that, the search condition setting unit 42 may include a keyword input to the keyword field 31 of the search screen 30 in the search condition. Further, the search condition setting unit 42 may include, in the search condition, not only the duplicate word but also a word other than the duplicate word from among the words acquired from the title of the product selected by the user. Then, the search condition setting unit 42 may set the weight of the duplicate word larger than the weight of the word other than the duplicate word.

The search execution unit 44 executes a search based on the search condition set by the search condition setting unit 42.

Figure 7:
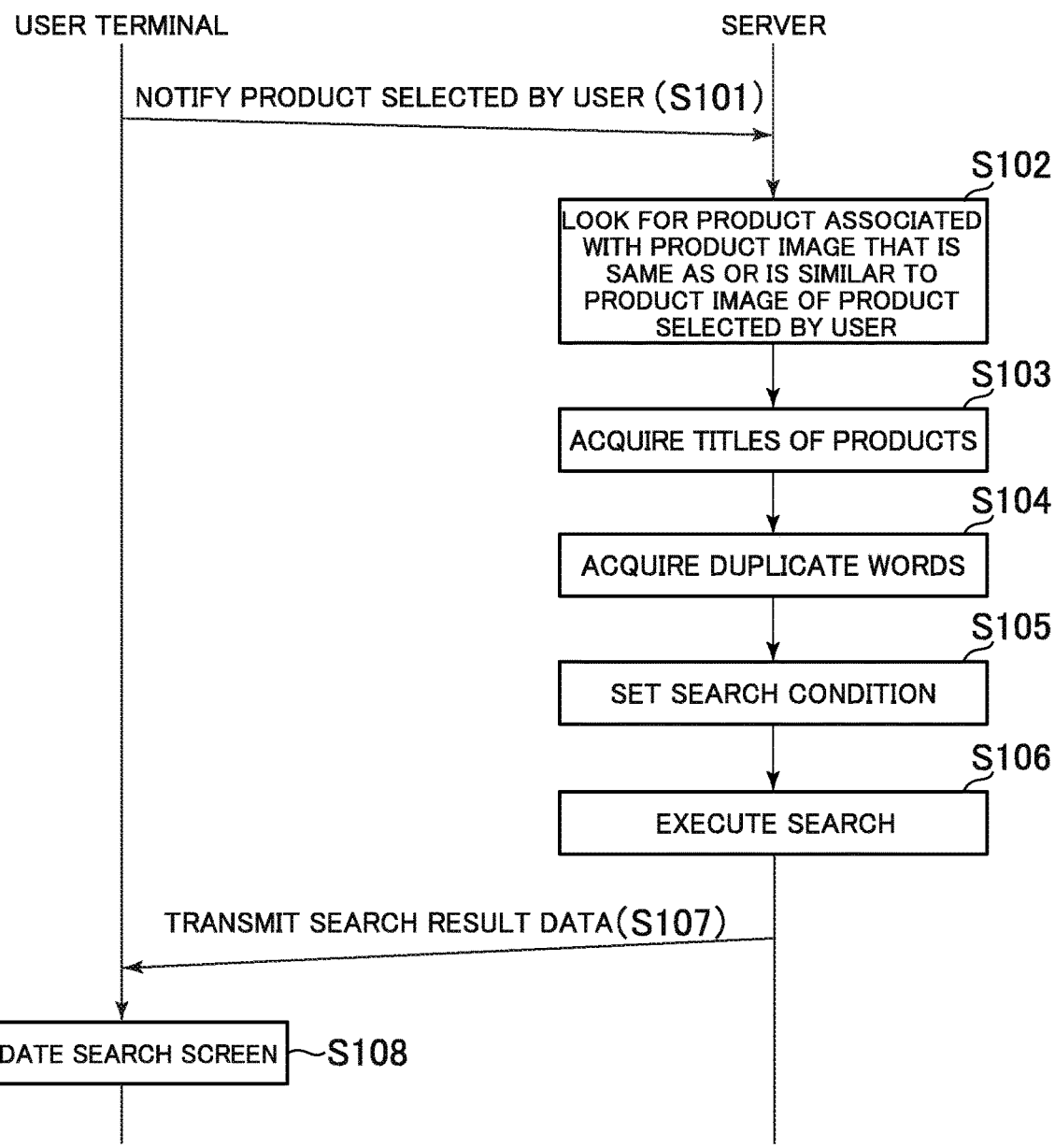
FIG. 7 is a diagram for illustrating an example of processing to be executed by the electronic commerce system according to the first embodiment.

Next, a description is given of processing for implementing the functional blocks described above. FIG. 7 is an illustration of an example of processing to be executed when the similarity search icon 35 is clicked.

When the similarity search icon 35 displayed on the product image 33 is clicked, as illustrated in FIG. 7, the control unit 21 of the user terminal 20 notifies the server 10 of the product selected by the user (that is, the product corresponding to the product image 33), to thereby request a search for a similar product (S101). In this case, for example, the store ID and the product ID of the product selected by the user are transmitted to the server 10.

When the above-mentioned request is received by the server 10, the control unit 11 of the server 10 looks for a product associated with a product image that is the same as or is similar to the product image of the product selected by the user (S102).

For example, in Step S101, a list of product images 33 displayed on the search screen 30 (in another case, a list of product images 33 displayed on display unit 25) is transmitted to the server 10, and the control unit 11 looks for a product image that is the same as or is similar to the product image of the product selected by the user among the product images 33 displayed on the search screen 30 (in another case, product images 33 displayed on display unit 25). Note that, the control unit 11 may look for a product image that is the same as or is similar to the product image of the product selected by the user among product images 33 stored in the database 15.

After Step S102 is executed, the control unit 11 acquires the title of the product selected by the user and the title of the product found in Step S102 (S103). Then, the control unit 11 acquires a duplicate word from the titles acquired in Step S103 (S104). That is, the control unit 11 acquires a word contained in duplicate in the titles acquired in Step S103 as a duplicate word. Further, the control unit 11 also acquires, as the duplicate word, a word whose meaning is the same as or is similar to that of a word contained in the title of the product found in Step S102 among words contained in the title of the product selected by the user. Note that, the control unit 11 excludes a word containing a number. Further, when a word indicating a category (category word) is contained in the title of the product selected by the user, the control unit 11 acquires that category word.

After Step S104 is executed, the control unit 11 sets a search condition based on the duplicate word (and category word) acquired in Step S104 (S105). Then, the control unit 11 executes a search based on the search condition set in Step S105 (S106). In this case, a list of products whose title or product page contains all of the duplicate words (and category word) acquired in Step S104 is acquired as a search result.

After Step S106 is executed, the control unit 11 transmits search result data indicating the search result to the user terminal 20 (S107). Then, the control unit 21 of the user terminal 20 updates the search screen 30 based on this search result data (S108). In this case, the list of products acquired as the search result is displayed on the search screen 30. Further, the words contained in the search condition set in Step S105 are displayed in the keyword field 31.

In the electronic commerce system 1 according to the first embodiment described above, a word contained in both the title of the product selected by the user and the title of a similar product of the product selected by the user (that is, a product of a product image that is the same as or is similar to the product image of the product selected by the user) is acquired as a duplicate word. Then, the search condition for searching for a similar product of the product selected by the user is set based on the duplicate word.

Such a duplicate word is highly likely to be a word indicating characteristics specific to the product selected by the user. Thus, according to the electronic commerce system 1, the search condition is more likely to contain a word having high relevance to the characteristics specific to the product selected by the user, whereas the search condition is less likely to contain a word having low relevance to the characteristics specific to the product selected by the user. That is, the accuracy of the search condition for searching for a similar product of the product selected by the user is improved.

Further, in the electronic commerce system 1, a word whose meaning is the same as or is similar to that of a word contained in the title of a similar product among words contained in the title of the product selected by the user is acquired as a duplicate word. Then, the search condition for searching for a similar product of the product selected by the user is set also based on the duplicate word.

The duplicate word also is highly likely to be a word indicating characteristics specific to the product selected by the user. Thus, the accuracy of the search condition for searching for a similar product of the product selected by the user is improved by using the duplicate word as well.

Second Embodiment

The overall configuration of an electronic commerce system 1 according to the second embodiment of the present invention is the same as that of the first embodiment (refer to FIG. 1). Further, also in the electronic commerce system 1 according to the second embodiment, the same search screen 30 as that of the first embodiment is displayed (refer to FIG. 2 to FIG. 4), and the same data as that of the first embodiment is stored (refer to FIG. 5).

Also in the electronic commerce system 1 according to the second embodiment, similar functional blocks as those of the first embodiment are implemented (refer to FIG. 6). Note that, in the electronic commerce system 1 according to the second embodiment, the operation of the duplicate word acquisition unit 40 is different from that of the first embodiment.

Specifically, the duplicate word acquisition unit 40 is different from the duplicate word acquisition unit 40 in the first embodiment in that the duplicate word acquisition unit 40 uses "an item associated with identification information that is the same as or is similar to identification information associated with the item selected by the user" as "another item having a predetermined relationship with the item selected by the user".

That is, the duplicate word acquisition unit 40 acquires, as a duplicate word, a word contained in both the title of the product selected by the user and the title of a product having the same product ID as the product ID of the product selected by the user.

Note that, the duplicate word acquisition unit 40 may also acquire, as the duplicate word, a word whose meaning is the same as is similar to that of a word contained in the title of a product having the same product ID as the product ID of the product selected by the user among words contained in the title of the product selected by the user.

Also in the electronic commerce system 1 according to the second embodiment, processing similar to that of the first embodiment is executed (refer to FIG. 7). Note that, in Step S102, the control unit 11 looks for a product having the same product ID as the product ID of the product selected by the user.

In the electronic commerce system. 1 according to the second embodiment described above, a word contained in both the title of the product selected by the user and the title of a product (the same product) having the same product ID as the product ID of the product selected by the user is acquired as a duplicate word. Then, the search condition for searching for a similar product of the product selected by the user is set based on the duplicate word.

The duplicate word is highly likely to be a word indicating characteristics specific to the product selected by the user. Thus, according to the electronic commerce system 1, the search condition is more likely to contain a word having high relevance to the characteristics specific to the product selected by the user, whereas the search condition is less likely to contain a word having low relevance to the characteristics specific to the product selected by the user. That is, the accuracy of the search condition for searching for a similar product of the product selected by the user is improved.

Further, in the electronic commerce system 1, a word whose meaning is the same as or is similar to that of a word contained in the title of the same product among words contained in the title of the product selected by the user is acquired as a duplicate word. Then, the search condition for searching for a similar product of the product selected by the user is set based on the duplicate word.

The duplicate word is also highly likely to be a word indicating characteristics specific to the product selected by the user. Thus, the accuracy of the search condition for searching for a similar product of the product selected by the user is improved by using the duplicate word as well.

Third Embodiment

The overall configuration of an electronic commerce system 1 according to the third embodiment of the present invention is the same as that of the first embodiment (refer to FIG. 1). Further, also in the electronic commerce system 1 according to the third embodiment, the same search screen 30 as that of the first embodiment is displayed (refer to FIG. 2 to FIG. 4), and the same data as that of the first embodiment is stored (refer to FIG. 5).

Also in the electronic commerce system 1 according to the third embodiment, similar functional blocks as those of the first embodiment are implemented (refer to FIG. 6). Note that, in the electronic commerce system 1 according to the third embodiment, the operation of the duplicate word acquisition unit 40 is different from those of the first and second embodiments.

Specifically, the duplicate word acquisition unit 40 is different from the duplicate word acquisition unit 40 in the first embodiment and in the second embodiment in that the duplicate word acquisition unit 40 uses, when a plurality of items are selected by the user, one item out of the plurality of items selected by the user as "the item selected by the user" and another item out of the plurality of items selected by the user as "another item having a predetermined relationship with the item selected by the user".

That is, the duplicate word acquisition unit 40 acquires, when a plurality of products are selected by the user, a word contained in duplicate in the titles of those plurality of products as a duplicate word. Further, the duplicate word acquisition unit 40 may also acquire, as a duplicate word, a word that corresponds to words whose meanings are the same or similar with each other and which are contained duplicately in the titles of those plurality of products.

Note that, the operation of the duplicate word acquisition unit 40 when only one product is selected by the user is the same as that of the duplicate word acquisition unit 40 in the first embodiment or in the second embodiment.

Now, a description is given of processing to be executed in the electronic commerce system 1 according to the third embodiment. In the electronic commerce system 1 according to the third embodiment, Step S102 is skipped when a plurality of products are selected by the user. Further, in Step S103, the control unit 11 acquires respective titles of the plurality of products selected by the user. Note that, when only one product is selected by the user, the same processing as that of the first embodiment or the second embodiment is executed.

In the electronic commerce system 1 according to the third embodiment described above, when a plurality of products are selected by the user, a word contained in duplicate in the titles of the plurality of products selected by the user is acquired as a duplicate word. Then, the search condition for searching for a similar product of the products selected by the user is set based on the duplicate word.

The duplicate word is highly likely to be a word indicating characteristics common to the plurality of products selected by the user. Thus, according to the electronic commerce system 1, the search condition is highly likely to contain a word having high relevance to the characteristics specific to the products selected by the user, whereas the search condition is less likely to contain a word having low relevance to the characteristics specific to the products selected by the user. That is, the accuracy of the search condition for searching for a similar product of the products selected by the user is improved. That is, the accuracy of the search condition for searching for a similar product of the products selected by the user is improved.

Further, in the electronic commerce system 1, a word that corresponds to words whose meanings are the same or similar with each other and which are contained in duplicate in the titles of the plurality of products selected by the user is also acquired as a duplicate word. Then, the search condition for searching for a similar product of the products selected by the user is set also based on the duplicate word.

The duplicate word is also highly likely to be a word indicating characteristics specific to the products selected by the user. Thus, the accuracy of the search condition for searching for a similar product of the products selected by the user is improved by using the duplicate word as well.

Fourth Embodiment

The overall configuration of an electronic commerce system 1 according to the fourth embodiment of the present invention is the same as that of the first embodiment (refer to FIG. 1). Further, also in the electronic commerce system 1 according to the fourth embodiment, the same search screen 30 as that of the first embodiment is displayed (refer to FIG. 2 to FIG. 4), and the same data as that of the first embodiment is stored (refer to FIG. 5).

Figure 8:
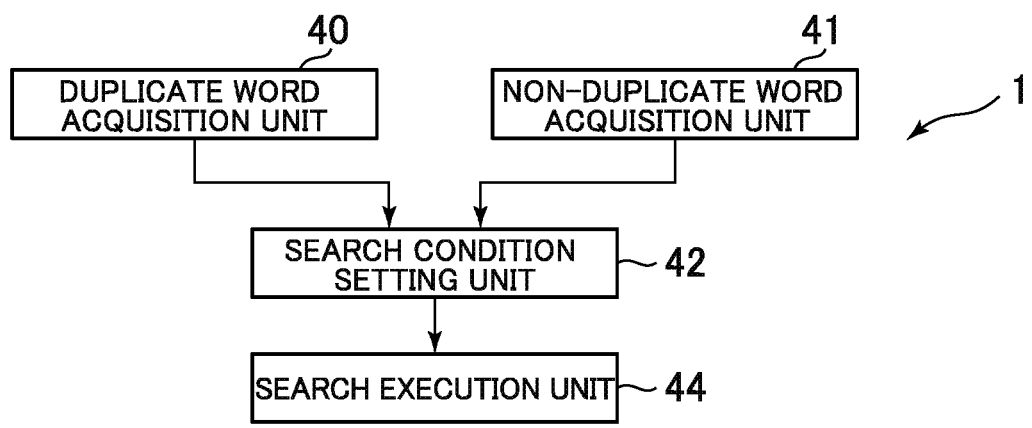
FIG. 8 is a functional block diagram for illustrating an example of functions implemented in an electronic commerce system according to the fourth embodiment of the present invention.

FIG. 8 is a functional block diagram for illustrating functional blocks implemented in the electronic commerce system 1 according to the fourth embodiment. As illustrated in FIG. 8, the electronic commerce system 1 includes the duplicate word acquisition unit 40 (duplicate word acquisition means), a non-duplicate word acquisition unit 41 (non-duplicate word acquisition means), the search condition setting unit 42 (search condition setting means), and the search execution unit 44 (search execution means). The electronic commerce system 1 according to the fourth embodiment is different from those of the first to third embodiments in that the electronic commerce system 1 according to the fourth embodiment includes the non-duplicate word acquisition unit 41.

The functional blocks illustrated in FIG. 8 are implemented by the server 10 or the user terminal 20. In the following, a description is given of a case where the functional blocks illustrated in FIG. 8 are implemented by the server 10. That is, a description is given of a case where the control unit 11 of the server 10 executes processing in accordance with a program to thereby function as the duplicate word acquisition unit 40, the non-duplicate word acquisition unit 41, the search condition setting unit 42, and the search execution unit 44.

The duplicate word acquisition unit 40 is the same as the duplicate word acquisition unit 40 in any one of the first to third embodiments.

The non-duplicate word acquisition unit 41 acquires, as a non-duplicate word, a word contained in only one of text information associated with the item selected by the user and text information associated with another item having a predetermined relationship with the item selected by the user.

For example, when the operation of the duplicate word acquisition unit 40 is the same as that of the duplicate word acquisition unit 40 in the first embodiment, "an item associated with an image that is the same as or is similar to an image associated with the item selected by the user" corresponds to "another item having a predetermined relationship with the item selected by the user".

In this case, the non-duplicate word acquisition unit 41 acquires, as a non-duplicate word, a word contained in only one of the title of the product selected by the user and the title of a product (similar product) associated with a product image that is the same as or is similar to a product image of the product selected by the user.

Now, it is assumed that the title of the product selected by the user contains "pink", the title of one similar product out of three similar products A to C contains "pink", and the titles of the remaining two similar products B and C contain "blue".

In this case, "pink" is contained in the title of the product selected by the user but is not contained in the titles of the similar products B and C, and thus the non-duplicate word acquisition unit 41 acquires "pink" as a non-duplicate word. Similarly, "blue" is contained in the title of the product selected by the user but is not contained in the title of the similar product A, and thus the non-duplicate word acquisition unit 41 acquires "blue" as a non-duplicate word.

Further, for example, when the operation of the duplicate word acquisition unit 40 is the same as that of the duplicate word acquisition unit 40 in the second embodiment, "an item associated with identification information that is the same as or is similar to identification information associated with the item selected by the user" corresponds to "another item having a predetermined relationship with the item selected by the user".

In this case, the non-duplicate word acquisition unit 41 acquires, as a non-duplicate word, a word contained in only one of the title of the product selected by the user and the title of a product having the same product ID as that of the product selected by the user.

Further, for example, when the operation of the duplicate word acquisition unit 40 is the same as that of the duplicate word acquisition unit 40 in the third embodiment, "one item out of the plurality of items selected by the user" corresponds to "the item selected by the user" and "another item out of the plurality of items selected by the user" corresponds to "another item having a predetermined relationship with the item selected by the user".

In this case, the non-duplicate word acquisition unit 41 acquires, as a non-duplicate word, a word contained in only one of the titles of the plurality of products selected by the user.

The search condition setting unit 42 (second search condition setting means) sets a search condition containing the duplicate word acquired by the duplicate word acquisition unit 40 and the non-duplicate word acquired by the non-duplicate word acquisition unit 41.

For example, when a plurality of duplicate words are acquired by the duplicate word acquisition unit 40 and a plurality of non-duplicate words are acquired by the non-duplicate word acquisition unit 41, the search condition setting unit 42 sets a search condition by concatenating, with an AND condition, a plurality of duplicate words concatenated with an AND condition and a plurality of non-duplicate words concatenated with an OR condition.

Now, it is assumed that duplicate words and non-duplicate words as given below are acquired.

Duplicate words: "ABC", "violet"

Non-duplicate words: "X series", "Z series", "autumn and winter"

In this case, the search condition setting unit 42 sets a search condition as given below.

("ABC" and "violet") and ("X series" or "Z series" or "autumn and winter")

Further, for example, when one duplicate word is acquired by the duplicate word acquisition unit 40 and a plurality of non-duplicate words are acquired by the non-duplicate word acquisition unit 41, the search condition setting unit 42 sets a search condition by concatenating, with an AND condition, one duplicate word and a plurality of non-duplicate words concatenated with an OR condition.

Now, it is assumed that a duplicate word and non-duplicate words as given below are acquired.

Duplicate word: "ABC"

Non-duplicate words: "X series", "Z series", "autumn and winter"

In this case, the search condition setting unit 42 sets a search condition as given below.

"ABC" and ("X series" or "Z series" or "autumn and winter")

When only one non-duplicate word is acquired by the non-duplicate word acquisition unit 41, the search condition setting unit 42 performs the same operation as that of the first to third embodiments. That is, the search condition setting unit 42 sets a search condition to contain the duplicate word acquired by the duplicate word acquisition unit 40 and not to contain the non-duplicate word acquired by the non-duplicate word acquisition unit 41.

Note that, also when one non-duplicate word is acquired by the non-duplicate word acquisition unit 41, the search condition setting unit 42 may set a search condition to contain the duplicate word acquired by the duplicate word acquisition unit 40 and the non-duplicate word acquired by the non-duplicate word acquisition unit 41.

For example, when one duplicate word is acquired by the duplicate word acquisition unit 40 and one non-duplicate word is acquired by the non-duplicate word acquisition unit 41, the search condition setting unit 42 may set a search condition by concatenating one duplicate word and one non-duplicate word with an AND condition.

Further, when a plurality of duplicate words are acquired by the duplicate word acquisition unit 40 and one non-duplicate word is acquired by the non-duplicate word acquisition unit 41, a search condition may be set by concatenating, with an AND condition, a plurality of duplicate words concatenated with an AND condition and one non-duplicate word.

The search execution unit 44 is the same as the search execution unit 44 of the first to third embodiments.

A description is given of processing for implementing the functional blocks described above. As in FIG. 7, FIG. 9 is an illustration of an example of processing to be executed when the similarity search icon 35 is clicked.

Figure 9:
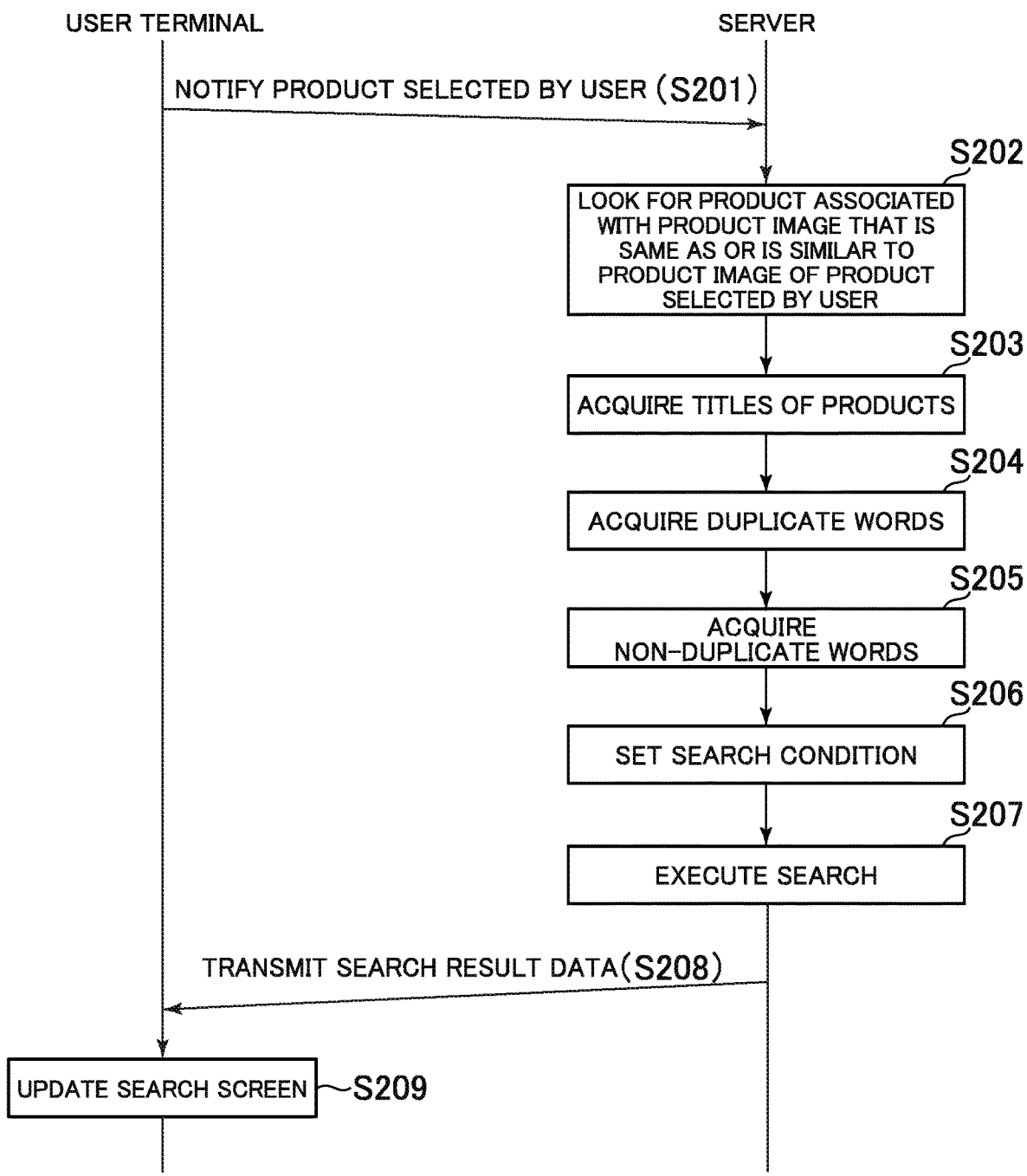
FIG. 9 is a diagram for illustrating an example of processing to be executed by the electronic commerce system according to the fourth embodiment.

Steps S201 to S204 of FIG. 9 are the same as Steps S101 to S104 of FIG. 7. Thus, a description thereof is omitted here.

After Step S204 is executed, the control unit 11 acquires a word (a non-duplicate word) that is contained in only one of the titles acquired in Step S203 (S205). Note that, the control unit 11 excludes a word including a number.

After Step S205 is executed, the control unit 11 sets the search condition based on the duplicate word (and the category word) acquired in Step S204 and the non-duplicate word acquired in Step S205 (S206). Then, the control unit 11 executes a search based on the search condition set in Step S206 (S207).

After Step S207 is executed, the control unit 11 transmits the search result data indicating the search result to the user terminal 20 (S208). Then, the control unit 21 of the user terminal 20 updates the search screen 30 based on the search result data (S209).

Using the electronic commerce system 1 according to the fourth embodiment described above as well, the search condition is highly likely to contain a word having high relevance to the characteristics specific to the product selected by the user.

Fifth Embodiment

The overall configuration of an electronic commerce system 1 according to a fifth embodiment of the present invention is the same as that of the first embodiment (refer to FIG. 1). Further, also in the electronic commerce system 1 according to the fifth embodiment, the same search screen 30 as that of the first embodiment is displayed (refer to FIG. 2 to FIG. 4), and the same data as that of the first embodiment is stored (refer to FIG. 5).

Figure 10:
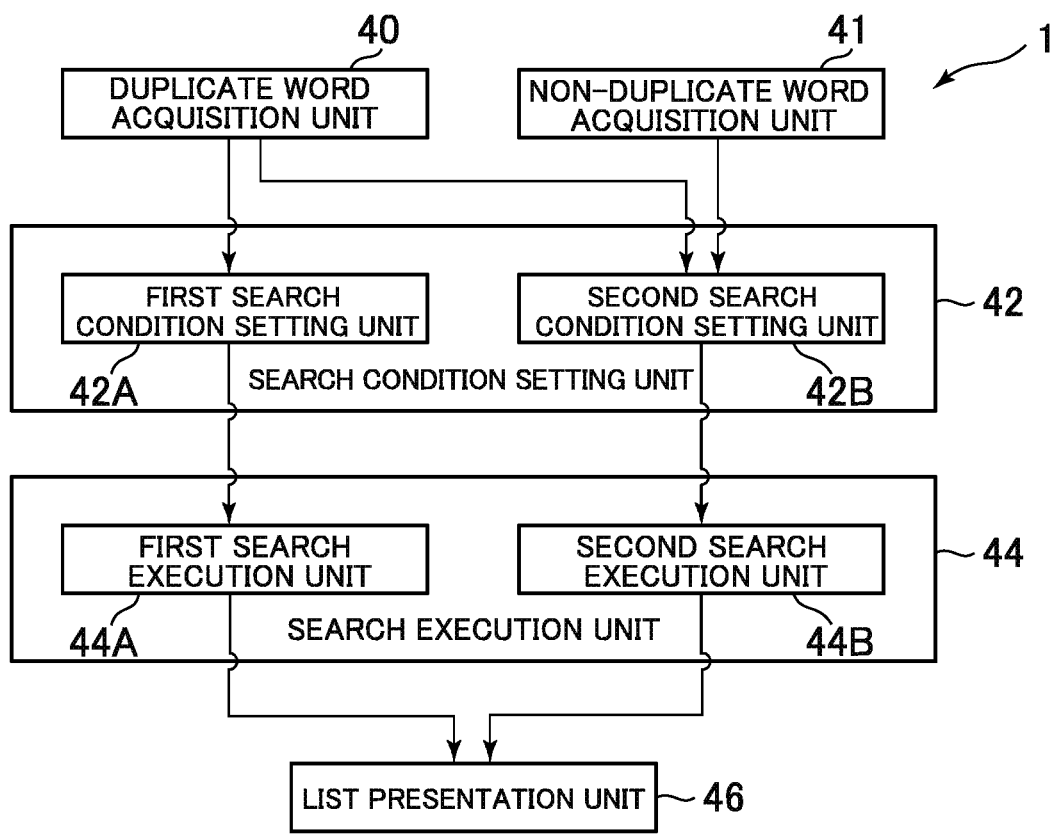
FIG. 10 is a functional block diagram for illustrating an example of functions implemented in an electronic commerce system according to the fifth embodiment of the present invention.

FIG. 10 is a functional block diagram for illustrating functional blocks implemented in the electronic commerce system 1 according to the fifth embodiment. As illustrated in FIG. 10, the electronic commerce system 1 includes the duplicate word acquisition unit 40 (duplicate word acquisition means), the non-duplicate word acquisition unit 41 (non-duplicate word acquisition means), the search condition setting unit 42 (search condition setting means), the search execution unit 44 (search execution means), and a list presentation unit 46 (list presentation means).

The functional blocks illustrated in FIG. 10 are implemented by the server 10 or the user terminal 20. In the following, a description is given of a case where the functional blocks illustrated in FIG. 10 are implemented by the server 10. That is, a description is given of a case where the control unit 11 of the server 10 executes processing in accordance with a program to thereby function as the duplicate word acquisition unit 40, the non-duplicate word acquisition unit 41, the search condition setting unit 42, the search execution unit 44, and the list presentation unit 46.

The duplicate word acquisition unit 40 is the same as the duplicate word acquisition unit 40 in any one of the first to third embodiments. Thus, a description thereof is omitted here.

The non-duplicate word acquisition unit 41 is the same as the non-duplicate word acquisition unit 41 in the fourth embodiment. Thus, a description thereof is omitted here.

The search condition setting unit 42 includes a first search condition setting unit 42A (first search condition setting means) and a second search condition setting unit 42B (second search condition setting means). The first search condition setting unit 42A is the same as the search condition setting unit 42 in any one of the first to third embodiments. Further, the second search condition setting unit 42B is the same as the search condition setting unit 42 in the fourth embodiment. Thus, a description thereof is omitted here.

The search execution unit 44 includes a first search execution unit 44A (first search execution means) and a second search execution unit 44B (second search execution means). The first search execution unit 44A executes a search based on the search condition set by the first search condition setting unit 42A. Further, the second search execution unit 44B executes a search based on the search condition set by the second search condition setting unit 42B.

The list presentation unit 46 presents, to the user, a list of items (products) acquired by the first search execution unit 44A or the second search execution unit 44B through a search.

For example, when the number of items in a list acquired by the first search execution unit 44A through a search is less than a threshold value, the list presentation unit 46 presents the list acquired by the first search execution unit 44A through a search to the user.

For example, when the number of items in a list acquired by the first search execution unit 44A through a search is less than a threshold value, the list presentation unit 46 presents the list acquired by the first search execution unit 44A through a search to the user. That is, when the number of items in a list acquired by the first search execution unit 44A through a search is not too large, the list presentation unit 46 presents the list acquired by the first search execution unit 44A through a search to the user.

On the other hand, when the number of items in a list acquired by the first search execution unit 44A through a search is more than the threshold value, the list presentation unit 46 presents the list acquired by the second search execution unit 44B through a search to the user. That is, when the number of items in a list acquired by the first search execution unit 44A through a search is too large, the list presentation unit 46 presents the list acquired by the second search execution unit 44B through a search to the user.

The number of items in a list acquired by the second search execution unit 44B through a search is less than the number of items in a list acquired by the first search execution unit 44A through a search, and hence, according to the configuration described above, it is possible to ensure that the number of items in a list presented to the user is not too large.

A description is given of processing for implementing the functional blocks described above. As in FIG. 7 and FIG. 9, FIG. 11 is an illustration of an example of processing to be executed when the similarity search icon 35 is clicked.

Steps S301 to S306 of FIG. 11 are the same as Steps S101 to S106 of FIG. 7. Thus, a description thereof is omitted here.

After Step S306 is executed, the control unit 11 determines whether or not the number of items in a list of products acquired in Step S306 as a search result is equal to or less than a threshold value (S307). When the above number of items is equal to or less than the threshold value, the control unit 11 transmits search result data indicating the search result acquired in Step S306 to the user terminal 20 (S311).

On the other hand, when the above number of items is not equal to or less than the threshold value, the control unit 11 acquires a word (a non-duplicate word) contained in only one of the titles acquired in Step S203 (S308). After Step S308 is executed, the control unit 11 sets a search condition based on the duplicate word (and category word) acquired in Step S304 and the non-duplicate word acquired in Step S308 (S309). Then, the control unit 11 executes a search based on the search condition set in Step S309 (S310). Note that, Step S308 to Step S310 are the same as Step S205 to Step S207 of FIG. 9.

After Step S310 is executed, the control unit 11 transmits the search result data indicating the search result acquired in Step S310 to the user terminal 20 (S311). The control unit 21 of the user terminal 20 updates the search screen 30 based on the search result data transmitted in Step S311 (S312).

Using the electronic commerce system 1 according to the fifth embodiment described above as well, the search condition is more likely to contain a word having high relevance to the characteristics specific to the product selected by the user. Further, using the electronic commerce system 1 according to the fifth embodiment, it is possible to ensure that the number of items in a list presented to the user is not too large.

Note that, the present invention is not limited to the embodiments described above.

[1] For example, a dictionary (blacklist) in which words that should not be contained in the search condition such as "free shipping" are registered may be stored in the database 15 and the like. Further, the search condition may be configured not to contain words registered in such a dictionary.

[2] For example, a dictionary in which synonyms (or similar words) such as "shoulder bag" and "over-the-shoulder bag" are registered may be stored in the database 15 and the like. Further, it may be configured to acquire a synonym of the duplicate word based on such a dictionary and include the duplicate word and the synonym (or a similar word) concatenated with an OR condition in the search condition.

[3] For example, it may be configured not to include, in the search condition, a word contained in the title of a product that is not selected by the user among products displayed on the search screen 30. The product that is not selected by the user among products displayed on the search screen 30 is likely to be a product in which the user has no interest. In this respect, with the configuration described above, it is possible to lower the possibility that the search condition contains a word indicating characteristics specific to a product in which the user has no interest.

[4] For example, when it is determined whether or not product images are the same with or are similar to each other, the product images may be converted into grayscale images. By doing so, it may be determined whether or not product images are the same with or are similar to each other by paying attention only to the shapes of the products.

Now, a case where a product image of a red product is selected by the user is assumed. In this case, for example, in Step S202 of the fourth embodiment (FIG. 9) or in Step S302 of the fifth embodiment (FIG. 11), a product image of a product that is the same as the product selected by the user but has a color (e.g., blue) different from that of the product selected by the user is found as a similar product image. In this case, if color names (red, blue) are contained in the titles of the respective products, in Step S205 or in Step 308, "red" and "blue" are acquired as non-duplicate words. As a result, in Step S206 or in Step S309, a search condition is set by concatenating those non-duplicate words with an OR condition, and a search for the same product having a different color is executed.

[5] For example, it may be configured that processing for determining whether or not product images are the same with or are similar to each other is executed in advance, and data indicating a determination result is stored in the database 15. That is, data indicating a combination of products having product images that are the same with or are similar to each other may be stored in the database 15 in advance. By doing so, it is possible to alleviate the processing loads of Step S102 (FIG. 7), Step S202 (FIG. 9), and Step S302 (FIG. 11).

[6] For example, the control unit 21 of the user terminal 20 (search condition setting device) may execute all or a part of Steps S102 to S106 (FIG. 7). That is, the user terminal 20 may implement all or a part of the functional blocks illustrated in FIG. 6. Note that, in this case, data necessary for executing Steps S102 to S106 needs to be stored in a storage unit accessible from the control unit 21. In another case, the database 15 may be configured to be accessible from the user terminal 20.

Similarly, the control unit 21 of the user terminal 20 (search condition setting device) may execute all or a part of Steps S202 to S207 (FIG. 9). That is, the user terminal 20 may implement all or a part of the functional blocks illustrated in FIG. 8.

Similarly, the control unit 21 of the user terminal 20 (search condition setting device) may execute all or a part of Steps S302 to S311 (FIG. 11). That is, the user terminal 20 may implement all or a part of the functional blocks illustrated in FIG. 11.

[7] For example, in the electronic commerce system 1, data such as electronic book data, music data, and video data may be sold as a product as well as things such as a bag and a drink. Further, in the electronic commerce system 1, a service may be sold as well as a product.

[8] In the above, an example of a case in which the present invention is applied to the electronic commerce system has been described. That is, an example of a case in which the search system according to the embodiments of the present invention is implemented in the electronic commerce system has been described. However, the present invention can also be applied to a system other than the electronic commerce system. Further, the present invention can also be applied to a search system for searching for an item other than a product and a service.

The invention claimed is:

1. A search condition setting device, comprising:
a processor; and
a memory device that stores a plurality of instructions,
wherein when the processor executes the instructions in the memory device, the processor is operable to:
selectively acquire, when a first item is selected by a user from a list of items, as a duplicate word, a word that is contained in text information associated with the first item and also contained in text information associated with a second item having a predetermined relationship with the first item, wherein the predetermined relationship between the first item and second item existed prior to the first item being selected by the user and is based on said second item being an item associated with an image that is the same as or similar to an image associated with the first item;
set the duplicate word as a keyword to search for a third item which is similar to the first item but which is not the second item;
wherein the first item, second item, and third item are products or services;
set a search condition for searching for the third item which is similar to the first item but which is not the second item based on the duplicate word;
wherein the processor is operable to execute a first processing for setting, when one duplicate word is acquired, the search condition to contain the one duplicate cate word, and for setting, when a plurality of duplicate words are acquired, the search condition to contain at least two duplicate words concatenated with an AND condition;

wherein the processor is operable to acquire, as a non-duplicate word, a word contained in only one of text information associated with the first item selected by the user and text information associated with the second item having the predetermined relationship, and wherein the processor is operable to execute a second processing for setting, when at least one duplicate word is acquired and a plurality of non-duplicate words are acquired, the search condition by concatenating, with an AND condition, the at least one duplicate word and the plurality of non-duplicate words concatenated with an OR condition.

2. The search condition setting device according to claim 1, wherein the processor is operable to also acquire, as the duplicate word, a word whose meaning is the same as or is similar to that of a word contained in text information associated with the second item among words contained in text information associated with the first item.

3. The search condition setting device according to claim 1, wherein the processor is operable to:
execute a first search based on a search condition set by the first processing; and
execute a second search based on a search condition set by the second processing,
wherein the processor is operable to present, to the user, a list of items acquired through the first search or the second search; and
wherein the processor is operable to:
present to the user, when a number of items contained in the list acquired through the first search is less than a threshold value, the list acquired through the first search; and
present to the user, when the number of items contained in the list acquired through the first search is more than the threshold value, the list acquired through the second search.

4. The search condition setting device according to claim 1, wherein the second item is an item associated with an image that is the same as or is similar to an image associated with the first item.

5. The search condition setting device according to claim 1, wherein the second item is an item associated with identification information that is the same as or is similar to identification information associated with the first item.

6. A search condition setting device, comprising:
a processor; and
a memory device that stores a plurality of instructions,
wherein when the processor executes the instructions in the memory device, the processor is operable to:
selectively acquire, when a first item and a second item are selected by a user from a list of items displayed on a display, as a duplicate word, a word that is contained in text information associated with the first item and also contained in text information associated with the second item;
set the duplicate word as a keyword to search for a third item which is similar to the first item and the second item;

wherein the first item, second item, and third item are products or services;
set a search condition for searching for the third item, which is similar to the first item and the second item, based on the duplicate word;
wherein the processor is operable to execute a first processing for setting, when one duplicate word is acquired, the search condition to contain the one duplicate word, and for setting, when a plurality of duplicate words are acquired, the search condition to contain at least two duplicate words concatenated with an AND condition;
wherein the processor is operable to acquire, as a non-duplicate word, a word contained in only one of text information associated with the first item selected by the user and text information associated with the second item having the predetermined relationship, and
wherein the processor is operable to execute a second processing for setting, when at least one duplicate word is acquired and a plurality of non-duplicate words are acquired, the search condition by concatenating, with an AND condition, the at least one duplicate word and the plurality of non-duplicate words concatenated with an OR condition.

7. The search condition setting device according to claim 1, wherein the processor is operable to acquire a category word, the category word being a word indicating a category of the first item,
wherein the processor is operable to set a search condition for searching for an item similar to the first item based on the duplicate word and the category word.

8. A control method for a search condition setting device, comprising:
selectively acquiring, when a first item is selected by a user from a list of items, as a duplicate word, a word that is contained in text information associated with the first item and also contained in text information associated with a second item having a predetermined relationship with the first item, wherein the predetermined relationship between the first item and second item existed prior to the first item being selected by the user and is based on said second item being an item associated with an image that is the same as or similar to an image associated with the first item;
set as a duplicate word as a keyword to search for a third item which is similar to the first item but which is not the second item;
wherein the first item, second item, and third item are products or services;
setting a search condition for searching for the third item which is similar to the first item, but which is not the second item, based on the duplicate word;
setting, when one duplicate word is acquired, the search condition to contain the one duplicate word, and setting, when a plurality of duplicate words are acquired, the search condition to contain at least two duplicate words concatenated with an AND condition;
acquire, as a non-duplicate word, a word contained in only one of text information associated with the first item selected by the user and text information associated with the second item having the predetermined relationship, and
setting, when at least one duplicate word is acquired and a plurality of non-duplicate words are acquired, the search condition by concatenating, with an AND condition, the at least one duplicate word and the plurality of non-duplicate words concatenated with an OR condition.

9. A non-transitory computer-readable information storage medium storing a program for causing a computer to:
acquire a first item selected by a user;
acquire a second item, which has a predetermined relationship to the first item;
   wherein the predetermined relationship between the first item and second item existed prior to the first item being selected by the user and is based on said second item being an item associated with an image that is the same as or similar to an image associated with the first item;
acquire text from a description of the first item;
acquire text from a description of the second item;
determine which text, from the description of the first item and the description of the second item, are the same;
set a search condition for searching for a third item, based on the text which was determined to be the same;
wherein the first item, second item, and third item are products or services;
wherein the second item is selected by searching for an image of an item which is similar to an image of the first item;
perform a search for the third item; and
display the results of the search for the third item
setting, when a text is determined to be the same, the search condition to contain the text, and setting, when a plurality of text is determined to be the same, the search condition to contain the plurality of text concatenated with an AND condition;
acquire, as a non-duplicate word, text contained in only one of text from the description of the first item and text from the description of the second item having the predetermined relationship,
setting, when text is determined to be the same and a plurality of non-duplicate words are acquired, the search condition by concatenating, with an AND condition, the text determined to be the same and the plurality of non-duplicate words concatenated with an OR condition.

10. The search condition setting device according to claim 1,
   wherein the processor is further operable to execute a search based on the search condition.

11. The search condition setting device according to claim 6,
   wherein the processor is further operable to execute a search based on the search condition.

12. The non-transitory computer-readable information storage medium of claim 9, where the first item, the second item and the third item are all related, but different items.

13. The search condition setting device according to claim 1,
   wherein the text associated with the first item includes at least a product title or product page.

14. The search condition setting device according to claim 1,
   wherein the duplicate word is determined to be a duplicate based on dictionary data in which synonyms and words having a similar meaning are registered.

15. The search condition setting device according to claim 1,
   wherein the processor is configured to acquire a category word, the category word being a word indicating a category of the first item,
   wherein the processor is configured to set a search condition for searching for an item similar to the first item based on the duplicate word and the category word, and
   wherein the predetermined relationship between the first item and second item is determined to be duplicate words based on synonyms and the category word.

* * * * *